US012793310B2

(12) United States Patent
Volk et al.

(10) Patent No.: US 12,793,310 B2
(45) Date of Patent: Nov. 10, 2026

(54) EMBEDDED SENSORS IN IMMERSIVE REALITY HEADSETS TO ENABLE SOCIAL PRESENCE

(71) Applicant: Meta Platforms Technologies, LLC, Menlo Park, CA (US)

(72) Inventors: John Robert Volk, Piedmont, CA (US); Min Tao, San Jose, CA (US); Oskar Linde, San Carlos, CA (US); Adam Alan Mudrick, San Carlos, CA (US); Alexander Randon Cope, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 442 days.

(21) Appl. No.: 18/053,276

(22) Filed: Nov. 7, 2022

(65) Prior Publication Data

US 2024/0153182 A1 May 9, 2024

(51) Int. Cl.

*G06T 13/40* (2011.01)
*G06F 3/01* (2006.01)
*G06T 17/10* (2006.01)

(52) U.S. Cl.

CPC .............. *G06T 13/40* (2013.01); *G06F 3/012* (2013.01); *G06F 3/013* (2013.01); *G06F 3/017* (2013.01); *G06T 17/10* (2013.01)

(58) Field of Classification Search

USPC .......................................................... 345/419
See application file for complete search history.

(56) References Cited

U.S. PATENT DOCUMENTS 9,846,483 B2 12/2017 Petrov
11,106,899 B2 8/2021 Im et al.
(Continued)

FOREIGN PATENT DOCUMENTS

WO 2017184274 A1 10/2017

OTHER PUBLICATIONS

Castaneda D., et al., "A Review on Wearable Photoplethysmography Sensors and their Potential Future Applications in Health Care," Int J Biosens Bioelectron, Aug. 6, 2018, vol. 4, No. 4, 19 pages.
(Continued)

*Primary Examiner* — James A Thompson
*Assistant Examiner* — Kim Thanh T Tran
(74) *Attorney, Agent, or Firm* — McDermott Will & Schulte LLP

(57) ABSTRACT

A method for updating a subject avatar with a facial expression collected in real time. The method includes receiving, from a sensor on a facial interface of a headset, a signal indicative of a movement in a facial muscle from a user of the headset, determining a facial expression of the user with the signal from the sensor in the facial interface of the headset, based on a machine learning algorithm trained to associate the facial expression to the movement of the facial muscle, adjusting a subject avatar for the user of the headset based on the facial expression, and providing the subject avatar to an immersive reality application hosted by a remote server. A headset, a computer-readable medium storing instructions which, when executed by a processor cause the headset to perform the above method, and the processor, are also provided.

20 Claims, 6 Drawing Sheets

(56) References Cited

U.S. PATENT DOCUMENTS

| | | | | |
|---|---|---|---|---|
| 11,195,316 | B2 | 12/2021 | Tadi et al. | |
| 11,287,848 | B2 | 3/2022 | Aimone et al. | |
| 11,677,575 | B1 * | 6/2023 | Libin | H04L 12/1822 709/204 |
| 2009/0156925 | A1 * | 6/2009 | Jin | A61B 5/291 600/372 |
| 2011/0263946 | A1 * | 10/2011 | el Kaliouby | A61B 5/16 600/300 |
| 2014/0347265 | A1 * | 11/2014 | Aimone | G02C 11/10 345/156 |
| 2016/0260143 | A1 * | 9/2016 | Ekambaram | G06F 3/012 |
| 2017/0231490 | A1 * | 8/2017 | Toth | G16H 40/63 600/558 |
| 2017/0259167 | A1 | 9/2017 | Cook et al. | |
| 2017/0286759 | A1 * | 10/2017 | Yao | G06V 40/164 |
| 2018/0158246 | A1 * | 6/2018 | Grau | G06T 3/18 |
| 2018/0160982 | A1 * | 6/2018 | Laszlo | A61B 5/11 |
| 2019/0354334 | A1 * | 11/2019 | Billinghurst | G06F 3/013 |
| 2020/0034608 | A1 * | 1/2020 | Nduka | G02B 27/017 |
| 2020/0090392 | A1 | 3/2020 | Chou et al. | |
| 2021/0312684 | A1 * | 10/2021 | Zimmermann | A63F 13/5255 |
| 2022/0198731 | A1 * | 6/2022 | Lombardi | G06T 7/97 |
| 2023/0077010 | A1 * | 3/2023 | Zhang | G06V 40/171 |
| 2024/0104859 | A1 * | 3/2024 | Chand | G06F 3/011 |
| 2024/0382125 | A1 * | 11/2024 | Azuma | A61B 5/0531 |

OTHER PUBLICATIONS

Fribourg R., et al., "Towards New Methods of Multi-Sensory Feedback (Visual, Sound, Tactile, etc.) through an Avatar to Increase the Feeling of Social Presence in Virtual Reality," Ambiances Architectures Urbanites, 2022, 3 pages.

Gao W., "Wearable Biosensors for Continuous Health Monitoring," Oct. 25, 2019, 4 pages, Retrieved from Internet: URL: https://www.youtube.com/watch?v =-RZwHDSFz60.

Gursel A., "A 3D Printed Soft Force Sensor for Soft Haptics," IEEE, 2020, 2 pages, Retrieved from the Internet: URL: https://scholars.uow.edu.au/display/publicationse147363.

Jing Q., et al., "Aerosol-Jet-Printed, Conformable Microfluidic Force Sensors," Cell Reports Physical Science, Apr. 21, 2021, vol. 2, No. 4, 30 pages, Retrieved from the Internet: URL: https://www.sciencedirect.com/science/article/pii/S266638642100076X.

Lu N., et al., "Epidermal Electronic Systems for Sensing and Therapy," Nanosensors, Biosensors, Info-Tech Sensors and 3D Systems, Apr. 17, 2017, vol. 10167, 8 pages.

Morita S., et al., "Facial Expression Recognition Based on Facial Muscles Behavior Estimation," International Conference on Computer Vision Theory and Applications, 2006, pp. 48-55.

Robertson A., "Meta's Sci-Fi Haptic Glove Prototype lets you Feel VR Objects using Air Pockets/ A New Sci-Fi Interface for the Metaverse," The Yerge, Nov. 16, 2021, 8 pages.

Shennan J., Muscles of Facial Expression, Geeky Medics, Apr. 18, 2020, 19pgs, Retrieved from the Internet: URL: https://geekymedics.com/muscles-of-facial-expression/.

Solution., "Force Touch Solution," New Degree Technology, 2018, 7 pages.

Zhuang M., et al., "Highly Robust and Wearable Facial Expression Recognition via Deep-Learning-Assisted, Soft Epidermal Electronics," Research, Jul. 15, 2021, vol. 2021, 14 pages.

International Preliminary Report on Patentability for International Application No. PCT/US2023/036239, mailed May 15, 2025, 8 pages.

EPO—International Search Report and Written Opinion for International Application No. PCT/US2023/036239, mailed Jan. 2, 2024, 11 pages.

* cited by examiner

EMBEDDED SENSORS IN IMMERSIVE REALITY HEADSETS TO ENABLE SOCIAL PRESENCE

BACKGROUND

Field

The present disclosure is related to virtual reality and augmented reality (VR/AR) headsets configured with multiple facial sensors to enable social presence in immersive reality applications. More specifically, the present disclosure is associated with embedded sensors in VR/AR headsets to provide information and incorporate, in real time, a facial expression of a user to a subject avatar for an immersive reality application.

Background

Current VR/AR headsets incorporate eye tracking systems and inward-looking cameras (e.g., infrared cameras and the like) and ultrasound scanners to collect real-time information about the user's facial expressions. This information is relevant to generate subject avatars based on headset users that have a true social presence in an immersive reality environment. However, eye tracking systems, cameras, and scanners tend to be overly complex devices, bulky and heavy, involve heavy data protocols and manipulation, and consume large amounts of power.

SUMMARY

In a first embodiment, a computer-implemented method includes receiving, from a sensor on a facial interface of a headset, a signal indicative of a movement in a facial muscle from a user of the headset. The computer-implemented method also includes determining a facial expression of the user with the signal from the sensor in the facial interface of the headset, based on a chart mapping the facial expression to the movement of the facial muscle, adjusting a subject avatar for the user of the headset based on the facial expression, and providing the subject avatar to an immersive reality application hosted by a remote server.

In a second embodiment, a headset includes a facial interface including one or more sensors and is configured to contact a skin of a face of a headset user around two eyes and a nose in the face, wherein the one or more sensors are geometrically disposed on the facial interface to identify a motion of facial muscles of the headset user. The headset also includes a memory storing instructions and a chart, the chart including a map of a facial expression to the motion of facial muscles of the headset user, a processor configured to at least partially receive multiple signals from the one or more sensors, and identify a facial gesture of the headset user based on the signals and the chart, and a communications module configured to transmit the signals and the facial gesture to a remote server hosting an immersive reality application that includes an avatar of the headset user.

In a third embodiment, a computer-implemented method includes providing, from a remote server to a one or more headsets used by multiple participants in an immersive reality application, a subject avatar of a first participant. The computer-implemented method also includes receiving from a first headset, with the first participant, a signal indicative of a movement of a facial muscle of the first participant, determining a facial gesture of the first participant based on the signal, and updating the subject avatar of the first participant with the facial gesture.

In other embodiments, a non-transitory, computer-readable medium stores instructions which, when executed by a processor, cause a computer to execute a method. The method includes receiving, from a sensor on a facial interface of a headset, a signal indicative of a movement in a facial muscle from a user of the headset, determining a facial expression of the user with the signal from the sensor in the facial interface of the headset, based on a chart mapping the facial expression to the movement of the facial muscle, adjusting a subject avatar for the user of the headset based on the facial expression, and providing the subject avatar to an immersive reality application hosted by a remote server.

In yet another embodiment, a system includes a first means to store instructions and a second means to execute the instructions and cause the system to perform a method. The method includes receiving, from a sensor on a facial interface of a headset, a signal indicative of a movement in a facial muscle from a user of the headset, determining a facial expression of the user with the signal from the sensor in the facial interface of the headset, based on a chart mapping the facial expression to the movement of the facial muscle, adjusting a subject avatar for the user of the headset based on the facial expression, and providing the subject avatar to an immersive reality application hosted by a remote server.

These and other embodiments will be clear to one of ordinary skill in the art, in view of the following disclosure.

BRIEF DESCRIPTION OF THE DRAWINGS

In the figures, elements having the same or similar reference numerals are associated with the same or similar features and/or attributes, unless expressly stated otherwise.

DETAILED DESCRIPTION OF THE DRAWINGS

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

In current VR/AR headsets, eye tracking and face tracking enables social presence and are a core technology in VR platforms. State-of-the-art eye tracking and face tracking hardware use imaging systems which require significant system power and compute cycles, are relatively challenging to implement with high accuracy, and include expensive hardware. To resolve the above technical problem arising in the technical field of immersive reality applications, embodiments as disclosed herein use a set of analog sensors to enable facial muscle tracing and achieve social presence at low cost, low power consumption, and no TTL cost to the eye box.

In addition, embodiments as disclosed herein leverage a combination of pressure/haptic sensors, temperature sensors, audio, and potentially other sensors (e.g., inertial motion units—IMUs—) in the headset facial interface and other surfaces in contact with the user to enable eye tracking and face tracking features derived from the muscle contractions of a user. The sensors can identify which muscle is contracting with and the software can use this input to reconstruct the facial muscle movements in an avatar or understand where a user's gaze is directed in a scene. The pressure sensors will be able to identify muscle movement in the face against the stationary headset and the temperature sensors can detect increased blood flow to muscles, a sign of activation. The low voltage pressure and temperature signals require a lower computational load than image processing, potentially enabling power, cost, and thermal savings. Additionally, embodiments as disclosed herein can also assist optical technologies for better performance and lower power.

Example System Architecture

Figure 1:
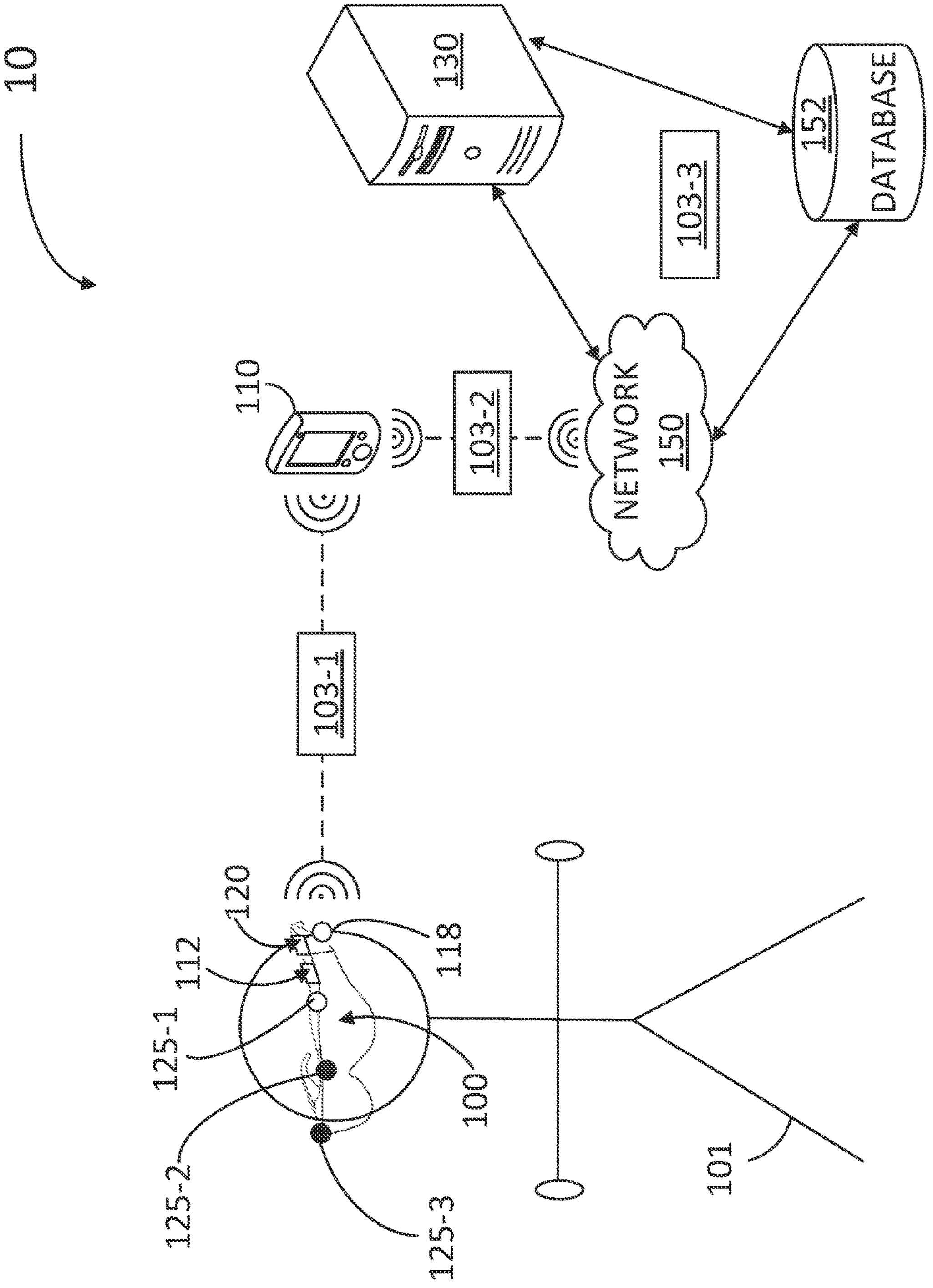
FIG. 1 illustrates an architecture including a headset coupled to a mobile device, a remote server and to a database, according to some embodiments.

FIG. 1 illustrates an architecture 10 including a VR/AR headset 100 with a user 101, coupled to one another, to a mobile device 110, a remote server 130 and to a database 152, according to some embodiments. VR/AR headset 100 may include a smart glass or augmented reality headset, and mobile device 110 may be a smart phone, all of which may communicate with one another via wireless communications and exchange a first dataset 103-1. In some embodiments, mobile device 110 may belong to user 101 as well. Dataset 103-1 may include a recorded video, audio, or some other file or streaming media. The user of wearable devices 100 is also the owner or is associated with mobile device 110.

Mobile device 110 may be communicatively coupled with remote server 130 and database 152 via a network 150, and transmit/share information, files, and the like with one another (e.g., dataset 103-2 and dataset 103-3).

In some embodiments, VR/AR headset 100 may include multiple sensors 125-1, 125-2 and 125-3 (hereinafter, collectively referred to as "sensors 125") such as inertial measurement units (IMUs), gyroscopes, microphones, cameras, and the like mounted within the frame of VR/AR headset 100. Other sensors 125 that can be included in VR/AR headset 100 may be magnetometers, microphones, photodiodes and cameras, touch sensors and other electromagnetic devices such as capacitive sensors, a pressure sensor, and the like. Smart glass 100 may include an acoustic microphone and a contact microphone. An acoustic microphone receives acoustic signals propagating through the air, as pressure waves. Contact microphones may be mechanically coupled to the skin and a bone of the user, e.g., in a facial interface of VR/AR headset 100, in contact with the user's face, and the like.

In addition, VR/AR headset 100, or mobile device 110 may include a memory circuit 120 storing instructions, and a processor circuit 112 configured to execute the instructions to cause smart glass 100 to perform, at least partially, some of the steps in methods consistent with the present disclosure. In some embodiments, VR/AR headset 100, mobile device 110, server 130, and/or database 152 may further include a communications module 118 enabling the device to wirelessly communicate with remote server 130 via network 150. In some embodiments, communications module 118 can include, for example, radio-frequency hardware (e.g., antennas, filters analog to digital converters, and the like) and software (e.g., signal processing software). VR/AR headset 100 may thus download a multimedia online content (e.g., dataset 103-1) from remote server 130, to perform at least partially some of the operations in methods as disclosed herein. Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

In particular embodiments, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. Architecture 10 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular embodiments, architecture 10 may use a user's previous activities and calculated moods, emotions, or sentiments to determine a present mood, emotion, or sentiment. A user who wishes to enable this functionality may indicate in their privacy settings that they opt in to architecture 10 receiving the inputs necessary to determine the mood, emotion, or sentiment. As an example and not by way of limitation, architecture 10 may determine that a default privacy setting is to not receive any information necessary for determining mood, emotion, or sentiment until there is an express indication from a user that architecture 10 may do so. By contrast, if a user does not opt in to architecture 10 receiving these inputs (or affirmatively opts out of architecture 10 receiving these inputs), architecture 10 may be prevented from receiving, collecting, logging, or storing these inputs or any information associated with these inputs. In particular embodiments, architecture 10 may use the predicted mood, emotion, or sentiment to provide recommendations or advertisements to the user. In particular embodiments, if a user desires to make use of this function for specific purposes or applications, additional privacy settings may be specified by the user to opt in to using the mood, emotion, or sentiment information for the specific purposes or applications. As an example and not by way of limitation, architecture 10 may use the user's mood, emotion, or sentiment to provide newsfeed items, pages, friends, or advertisements to a user. The user may specify in their privacy settings that architecture 10 may determine the user's mood, emotion, or sentiment. The user may then be asked to provide additional privacy settings to indicate the purposes for which the user's mood, emotion, or sentiment may be used. The user may indicate that architecture 10 may use his or her mood, emotion, or sentiment to provide newsfeed content and recommend pages, but not for recommending friends or advertisements. Architecture 10 may then only provide newsfeed content or pages based on user mood, emotion, or sentiment, and may not use that information for any other purpose, even if not expressly prohibited by the privacy settings.

Figure 2:
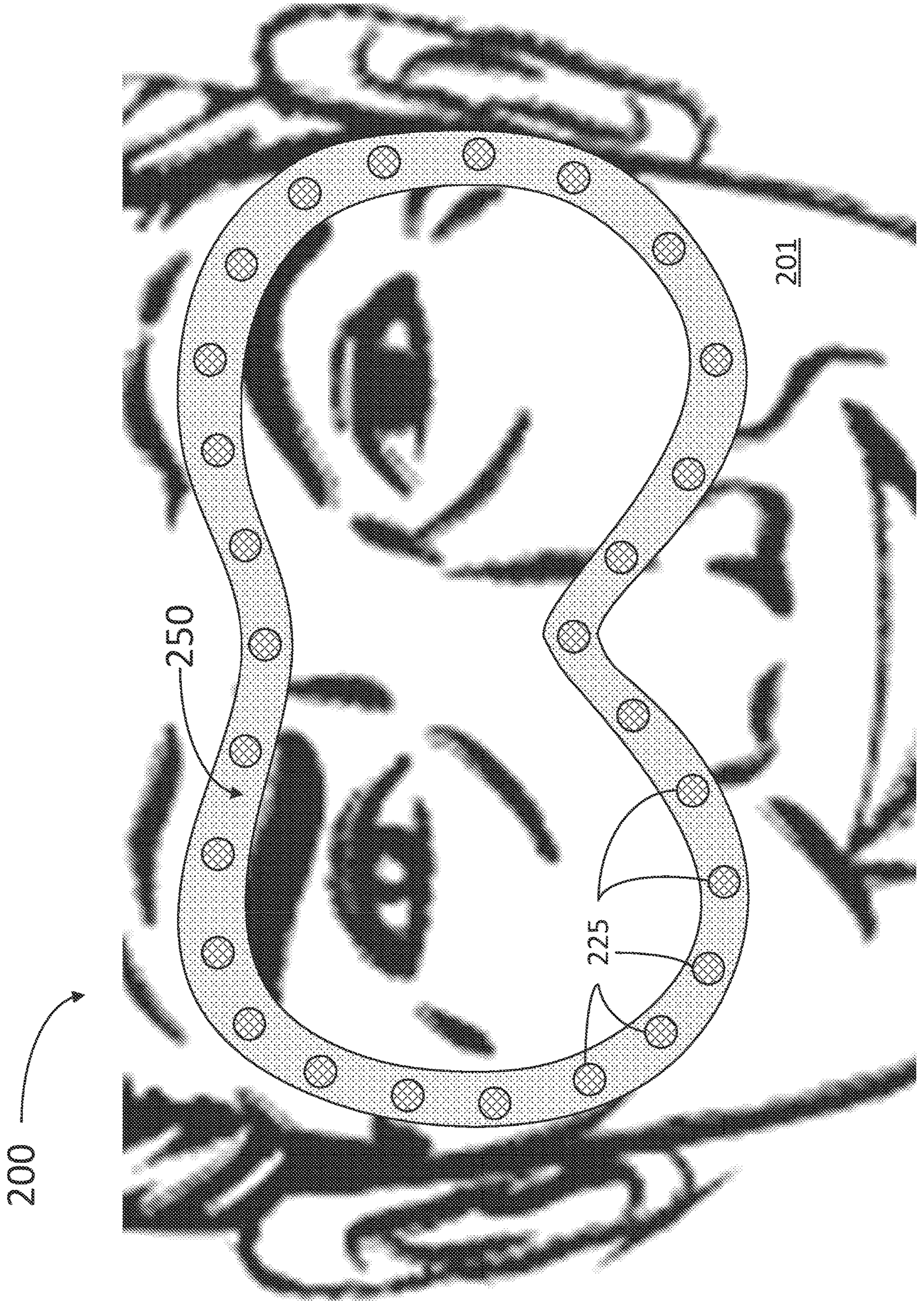
FIG. 2 illustrates a facial interface for a headset, including multiple sensors, according to some embodiments.

FIG. 2 illustrates a facial interface 250 for a headset 200, including multiple sensors 225 applied on the face of a user 201, according to some embodiments. Sensors 225 may include electromagnetic sensors such as electrocardiogram (ECG) sensors, electroencephalogram (EEG) sensors, capacitive sensors (or contact sensors), or electric dipole sensors, and the like. Sensors 225 may also include microphones such as contact microphones, and IMU sensors such as accelerometers, gyroscopes, and the like.

In some embodiments, sensors 225 may include optical sensors such as photoplethysmography (PPG) sensors to assess cardiovascular conditions of user 201 (e.g., heart rate and blood pressure from a facial artery). In some embodiments, sensors 225 may include haptic sensors, moisture sensors, and/or temperature sensors.

Figure 3:
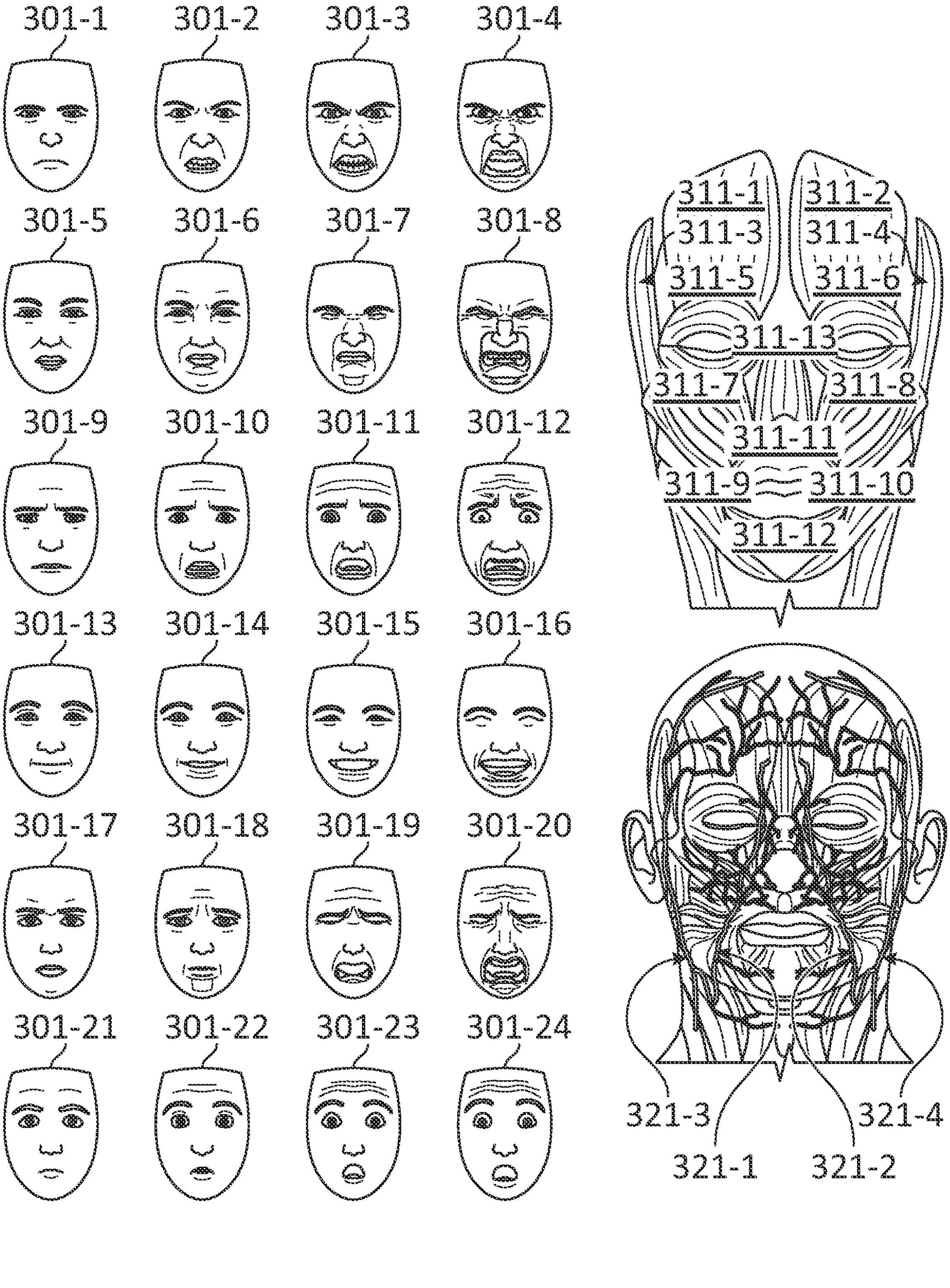
FIG. 3 illustrates a chart of facial expressions associated to facial muscles that activate them, according to some embodiments.

FIG. 3 illustrates a chart 300 of facial expressions 301-1 (e.g., sternness), 301-2 (e.g., indignation), 301-3 (e.g., anger), 301-4 (e.g., rage), 301-5 (e.g., disdain), 301-6 (e.g., aversion), 301-7 (e.g., disgust), 301-8 (e.g., revulsion), 301-9 (e.g., concern), 301-10 (e.g., anxiety), 301-11 (e.g., fear), 301-12 (e.g., terror), 301-13 (e.g., satisfaction), 301-14 (e.g., amusement), 301-15 (e.g., joy), 301-16 (e.g., laughter), 301-17 (e.g., dejection), 301-18 (e.g., melancholy), 301-19 (e.g., sadness), 301-20 (e.g., grief), 301-21 (e.g., alertness), 301-22 (e.g., wonder), 301-23 (e.g., surprise), and 301-24 (e.g., shock, hereinafter, collectively referred to as "facial expressions 301"), associated to facial muscles 311-1 (occipital-frontal, right), 311-2 (occipital-frontal left), 311-3 (temporal right), 311-4 (temporal left), 311-5 (orbital right), 311-6 (orbital left), 311-7 (maxillary right), 311-8 (maxillary left), 311-9 (chin right), 311-10 (chin left), 311-11 and 311-12 (orbicular-mouth), and 311-13 (nasal, hereinafter, collectively referred to as "facial muscles 311") that activate them, according to some embodiments.

Chart 300 may include, for each of facial expressions 301, the different facial muscles 311 activated and their degree of activation (e.g., "strong," "mild," "relaxed"). Muscle activation may be detected by an IMU sensor, a capacitance sensor, or an electric sensor that detects the electric field in the neurons that activate the muscle, or the muscle motion itself. Moisture sensors may also detect muscle motion, or anxiety patterns in the user's face. In addition, chart 300 may be supplemented with a list of facial arteries 321-1, 321-2, 321-3, and 321-4 (hereinafter, collectively referred to as "arteries 321"). Thus, chart 300 may also link to each one of facial expressions 301, or a specific artery 321 that increases its blood torrent (on account of the muscles that need to be activated). The blood flow through arteries 321 may be detected by a PPG sensor, or even a temperature sensor, as disclosed herein.

Figure 4:
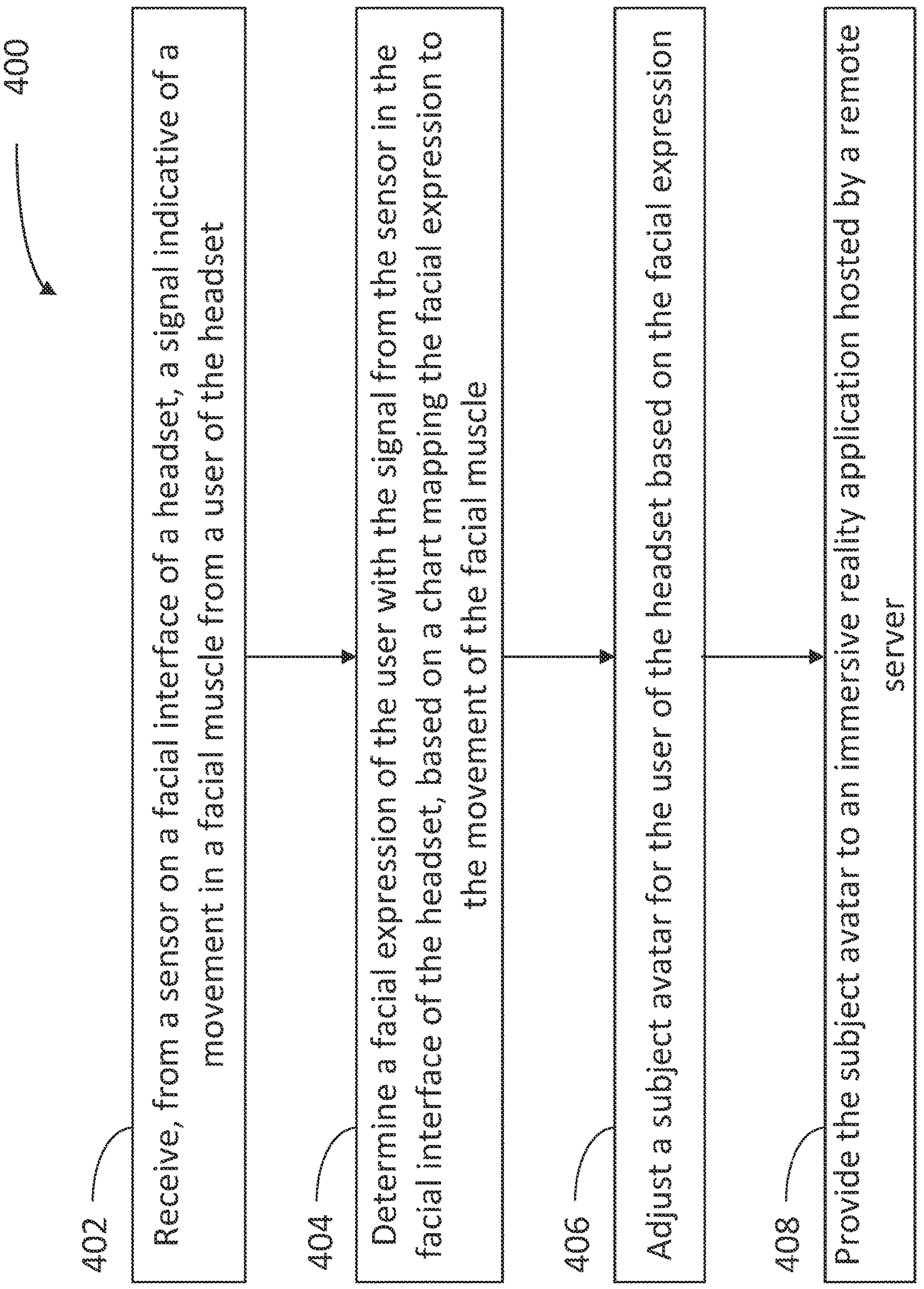
FIG. 4 is a flow chart illustrating steps in a method for updating subject avatars in real time for immersive reality applications, according to some embodiments.

FIG. 4 is a flow chart illustrating steps in a method 400 for updating subject avatars in real time for immersive reality applications, according to some embodiments. Embodiments consistent with the present disclosure may include at least one or more of the steps in method 400 performed by a processor circuit executing instructions stored in a memory circuit in a headset, in a mobile device, or in a remote server, as disclosed herein (e.g., processor circuit 112 and memory circuit 120, headset 100, mobile device 110, and remote server 130). In some embodiments, methods consistent with the present disclosure includes receiving data from multiple sensors mounted on the facial interface of a headset as disclosed herein (e.g., sensors 125 and facial interface 250 in headsets 100 or 200). In yet other embodiments, methods consistent with the present disclosure may include one or more of the steps in method 400 performed in a different order, simultaneously, quasi-simultaneously, or overlapping in time.

Step 402 includes receiving, from a sensor on a facial interface of a headset, a signal indicative of a movement in a facial muscle from a user of the headset. In some embodiments, step 402 includes receiving a signal from one of an inertial motion unit, from an electrical sensor, from a capacitive sensor, from a contact microphone, from an optical sensor, from a haptic sensor, and from a temperature sensor. In some embodiments, the signal is an electrical signal from a neural activation of the facial muscle, and step 402 includes identifying the facial muscle by a location of the sensor on the facial interface. In some embodiments, step 402 includes receiving multiple signals from multiple sensors disposed on the facial interface of the headset, further comprising correlating the signals to assess whether and to what extent one or more facial muscles from the user of the headset are moved.

Step 404 includes determining a facial expression of the user with the signal from the sensor in the facial interface of the headset, based on a chart mapping the facial expression to the movement of the facial muscle. In some embodiments, the facial muscle is a muscle that moves an eye pupil of the user of the headset, and step 404 includes determining a gaze direction of the user of the headset. In some embodiments, step 404 further includes determining a user physical condition based on the facial expression of the user. In some embodiments, step 404 further includes determining a user psychological condition based on the facial expression of the user and an environment in the immersive reality application.

Step 406 includes adjusting a subject avatar for the user of the headset based on the facial expression. In some embodiments, step 406 includes molding a three-dimensional solid model of a face of the user of the headset based on the facial expression.

Step 408 includes providing the subject avatar to an immersive reality application hosted by a remote server. In some embodiments, step 408 further includes displaying in the headset a feedback message for the user based on the facial expression. In some embodiments, step 408 includes modifying the facial expression of the user based on an audience in the immersive reality application.

Figure 5:
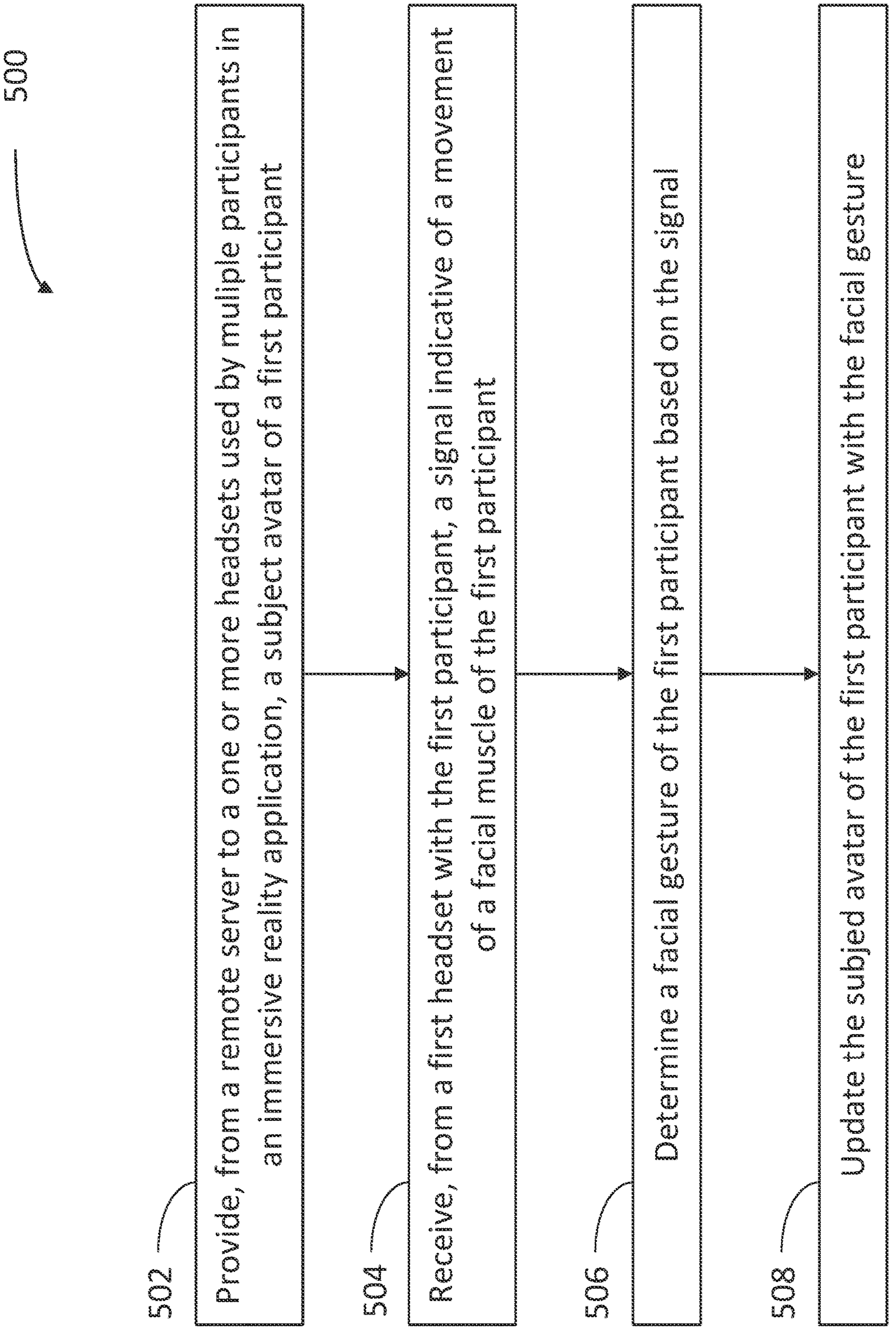
FIG. 5 is a flow chart illustrating steps in a method for updating subject avatars using sensor information in a VR/AR headset, according to some embodiments.

FIG. 5 is a flow chart illustrating steps in a method 500 for updating subject avatars using sensor information in a VR/AR headset, according to some embodiments. Embodiments consistent with the present disclosure may include at least one or more of the steps in method 500 performed by a processor circuit executing instructions stored in a memory circuit in a headset, in a mobile device, or in a remote server, as disclosed herein (e.g., processor circuit 112 and memory circuit 120, headset 100, mobile device 110, and remote server 130). In some embodiments, methods consistent with the present disclosure includes receiving data from multiple sensors mounted on the facial interface of a headset as disclosed herein (e.g., sensors 125 and facial interface 250 in headsets 100 or 200). In yet other embodiments, methods consistent with the present disclosure may include one or more of the steps in method 500 performed in a different order, simultaneously, quasi-simultaneously, or overlapping in time.

Step 502 includes providing, from a remote server to a one or more headsets used by multiple participants in an immersive reality application, a subject avatar of a first participant.

Step 504 includes receiving from a first headset, with the first participant, a signal indicative of a movement of a facial muscle of the first participant. In some embodiments, step 504 includes receiving a signal from at least one of an inertial motion sensor, a contact microphone, an electric sensor, a capacitive sensor, an optical sensor, a haptic sensor, and a temperature sensor. In some embodiments, step 504 includes integrating multiple signals from one or more sensors in a facial interface of the first headset. In some embodiments, step 504 includes receiving from a headset with a second participant, a signal indicative of a movement of a facial muscle from the second participant, determining a facial gesture of the first participant based on the signal, and updating the subject avatar of the second participant with the facial gesture.

Step 506 includes determining a facial gesture of the first participant based on the signal. In some embodiments, step 506 includes conferring with a chart associating the movement of the facial muscle with the facial gesture.

Step 508 includes updating the subject avatar of the first participant with the facial gesture.

Hardware Overview

Figure 6:
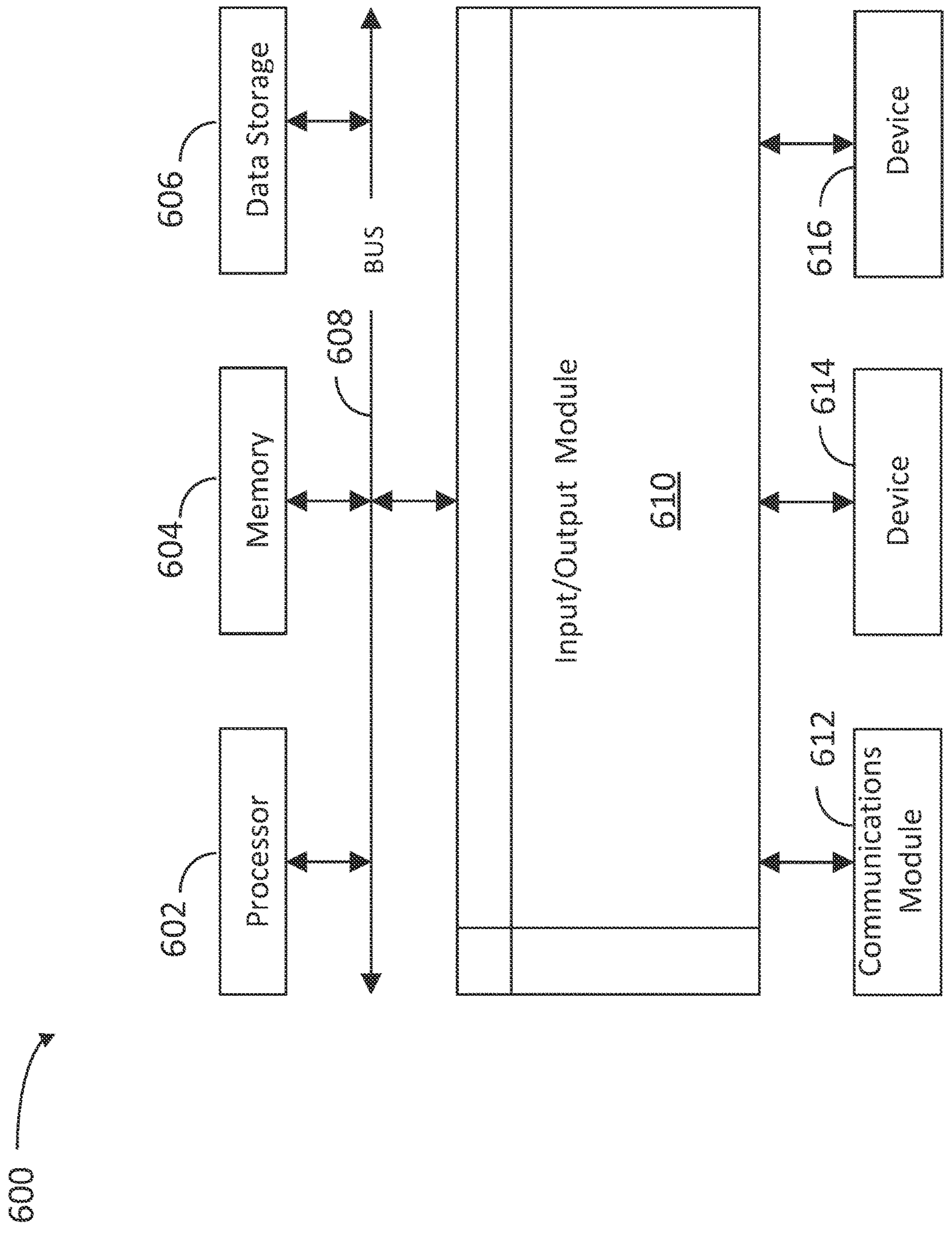
FIG. 6 illustrates a block diagram of a computer system for use in methods as disclosed herein.

FIG. 6 is a block diagram illustrating a computer system for implementing a headset and methods for use thereof, according to some embodiments. In certain aspects, computer system 600 may be implemented using hardware or a combination of software and hardware, either in a dedicated server, or integrated into another entity, or distributed across multiple entities. Computer system 600 may include a desktop computer, a laptop computer, a tablet, a phablet, a smartphone, a feature phone, a server computer, or otherwise. A server computer may be located remotely in a data center or be stored locally.

Computer system 600 includes a bus 608 or other communication mechanism for communicating information, and a processor 602 (e.g., processor 112) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, e.g., one or more modules of computer program instructions encoded on a computer-readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled with bus 608 for storing information and instructions. Computer system 600 may be coupled via input/output module 610 to various devices. Input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, input/output module 610 is configured to connect to a plurality of devices, such as an input device 614 and/or an output device 616. Exemplary input devices 614 include a keyboard and a pointing device, e.g., a mouse or a trackball, by which a consumer can provide input to the computer system 600. Other kinds of input devices 614 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 616 include display devices, such as an LCD (liquid crystal display) monitor, for displaying information to the consumer.

According to one aspect of the present disclosure, smart glass 100 can be implemented, at least partially, using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term “machine-readable storage medium” or “computer-readable medium” as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires forming bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase “at least one of” preceding a series of items, with the terms “and” or “or” to separate any of the items, modifies the list as a whole, rather than each member of the list (e.g., each item). The phrase “at least one of” does not require selection of at least one item; rather, the phrase allows a meaning that includes at least one of any one of the items, and/or at least one of any combination of the items, and/or at least one of each of the items. By way of example, the phrases “at least one of A, B, and C” or “at least one of A, B, or C” each refer to only A, only B, or only C; any combination of A, B, and C; and/or at least one of each of A, B, and C.

The word “exemplary” is used herein to mean “serving as an example, instance, or illustration.” Any embodiment described herein as “exemplary” is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean “one and only one” unless specifically stated, but rather “one or more.” Pronouns in the masculine (e.g., his) include the feminine and neuter gender (e.g., her and its) and vice versa. The term “some” refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:

receiving, from a sensor on a facial interface of a first headset, a signal indicative of a movement in a facial muscle from a first user of the first headset;

determining, based on the signal, a degree of activation of the facial muscle based on changes in blood flow in facial arteries associated with contractions of facial muscles of the first user;

determining a facial expression of the first user with the signal from the sensor in the facial interface of the first headset, based on a machine learning algorithm trained to associate the facial expression with the movement of the facial muscle based at least in part on the degree of activation of the facial muscle;

adjusting a subject avatar of the first user of the first headset based on the facial expression; and providing, from a remote server hosting an immersive reality application, the adjusted subject avatar to one or more headsets used by multiple users in the immersive reality application.

2. The computer-implemented method of claim 1, further comprising receiving the signal from one of an inertial motion unit, from an electrical sensor, from a capacitive sensor, from a contact microphone, from an optical sensor, from a haptic sensor, from a moisture sensor, and from a temperature sensor.

3. The computer-implemented method of claim 1, wherein the signal is an electrical signal from a neural activation of the facial muscle, further comprising identifying the facial muscle by a location of the sensor on the facial interface.

4. The computer-implemented method of claim 1, wherein receiving a signal from a sensor comprises receiving multiple signals from multiple sensors disposed on the facial interface of the first headset, further comprising correlating the signals to assess whether and to what extent one or more facial muscles from the first user of the first headset are moved.

5. The computer-implemented method of claim 1, wherein adjusting the subject avatar for the first user comprises molding a three-dimensional solid model of a face of the first user of the first headset based on the facial expression.

6. The computer-implemented method of claim 1, wherein the facial muscle is a muscle that moves an eye pupil of the first user of the first headset, and comprising, determining the facial expression of the first user comprises determining a gaze direction of the first user of the first headset.

7. The computer-implemented method of claim 1, further comprising determining a user physical condition based on the facial expression of the first user.

8. The computer-implemented method of claim 1, further comprising determining a user psychological condition based on the facial expression of the first user and an environment in the immersive reality application.

9. The computer-implemented method of claim 1, further comprising displaying in the first headset a feedback message for the first user based on the facial expression.

10. The computer-implemented method of claim 1, further comprising modifying the facial expression of the first user based on an audience in the immersive reality application.

11. A headset, comprising:

a facial interface including one or more sensors and configured to contact a skin of a face of a headset user around two eyes and a nose in the face, wherein the one or more sensors are geometrically disposed on the facial interface to identify a motion of facial muscles of the headset user and a degree of activation of the facial muscles;

a memory storing instructions and a chart, the chart including a map of a facial expression to the motion of facial muscles of the headset user;

a processor configured to at least partially receive multiple signals from the one or more sensors, identify a facial gesture of the headset user based on the signals and the chart, and determine, based on the signal, the degree of activation of the facial muscle based on changes in blood flow in facial arteries associated with contractions of the facial muscles of the headset user;

and a communications module configured to transmit the signals and the facial gesture to a remote server hosting an immersive reality application that includes an avatar of the headset user, and provide, from the remote server, an adjusted subject avatar to one or more headsets used by multiple users in the immersive reality application.

12. The headset of claim 11, wherein the one or more sensors include at least one of an inertial motion sensor, an electric sensor, a capacitance sensor, a contact microphone, an optical sensor, a haptic sensor, a moisture sensor, and a temperature sensor.

13. The headset of claim 11, wherein the one or more sensors include a photoplethysmography sensor to determine a cardiovascular activity across the nose of the headset user.

14. The headset of claim 11, wherein the one or more sensors include electrical sensors symmetrically disposed around the two eyes of the headset user, and configured to assess a gaze direction of the headset user.

15. The headset of claim 11, wherein a portion of the facial interface including the one or more sensors is detachable from the headset.

16. A computer-implemented method, comprising:

providing, from a remote server to one or more headsets used by multiple participants in an immersive reality application, a subject avatar of a first participant;

receiving, from a first headset, with the first participant, a signal indicative of a movement of a facial muscle and a degree of activation of the facial muscle of the first participant;

determining, based on the signal, the degree of activation of the facial muscle based on changes in blood flow in facial arteries associated with contractions of facial muscles of the first participant;

determining a facial gesture of the first participant based on the signal; updating the subject avatar of the first participant with the facial gesture; and providing, from the remote server, the updated subject avatar to the one or more headsets used by multiple users in the immersive reality application.

17. The computer-implemented method of claim 16, further comprising receiving the signal from at least one of an inertial motion sensor, a contact microphone, an electric sensor, a capacitive sensor, an optical sensor, a haptic sensor, a moisture sensor, and a temperature sensor.

18. The computer-implemented method of claim 16, wherein receiving the signal indicative of the movement of the facial muscle further comprises integrating multiple signals from one or more sensors in a facial interface of the first headset.

19. The computer-implemented method of claim 16, further comprising receiving from a headset with a second participant, a second signal indicative of a movement of a facial muscle from the second participant, determining a facial gesture of the first participant based on the second signal, and updating the subject avatar of the second participant with the facial gesture.

20. The computer-implemented method of claim 16, wherein determining the facial gesture of the first participant further comprises conferring with a chart associating the movement of the facial muscle with the facial gesture.

* * * * *